Jan. 3, 1967 R. W. JENNY 3,295,385
AUTOMATIC ANTI-FRICTION DUAL RATIO MOTION CONVERTER
Filed Dec. 16, 1964 2 Sheets-Sheet 1

INVENTOR.
ROBERT W. JENNY
BY
AGENT

Jan. 3, 1967   R. W. JENNY   3,295,385
AUTOMATIC ANTI-FRICTION DUAL RATIO MOTION CONVERTER
Filed Dec. 16, 1964   2 Sheets-Sheet 2

INVENTOR.
ROBERT W. JENNY
BY
AGENT 3,295,385
AUTOMATIC ANTI-FRICTION DUAL RATIO MOTION CONVERTER
Robert W. Jenny, Bellevue, Wash., assignor to The Boeing Company, Seattle, Wash., a corporation of Delaware
Filed Dec. 16, 1964, Ser. No. 418,771
6 Claims. (Cl. 74—424.8)

This invention relates to anti-friction screw thread mechanisms and more particularly to such a mechanism with an automatic and adjustable dual ratio feature.

In general, the present invention provides an apparatus which converts rotary motion into rectilinear motion and, depending on the amount of load being carried in the linear direction, the ratio of the amount of linear motion relative to the amount of rotary motion can change between two values. For example, the ratio may be expressed in revolutions of a shaft which will produce a linear displacement of said shaft in inches; and this ratio may change between two values in such a manner that the same number of revolutions of the shaft in two different cases will produce a greater or lesser amount of linear displacement of the shaft in inches depending upon the load carried by the device.

Allowable variations in size, complexity, configuration, quality, precision and materials are the basis of substantial flexibility in the design of the present invention. Therefore, many applications for the subject anti-friction screw thread mechanism with an automatic and adjustable dual ratio feature can be realized in all phases of industry. For instance; application may range from simple automobile jacks to drilling installations, driving of airplane wing flaps, a broad line of "off the shelf items," to sophisticated linear actuators.

One of the major objects of the invention is to provide a simple, rugged, dependable motion converter having an automatic dual ratio feature with change from one ratio to the other occurring at a predetermined load level carried by the device.

It is another object of this invention to provide a motion converter having an automatic dual ratio feature wherein the ratio selection is sensitive to the amount of load carried by said device and the load level at which the ratio change occurs is adjustable.

Furthermore, this invention provides other objects, features, and advantages which will become fully apparent from the following detailed description taken in conjunction with the accompanying drawings which illustrate and clarify a preferred embodiment of this device.

Figure 1:
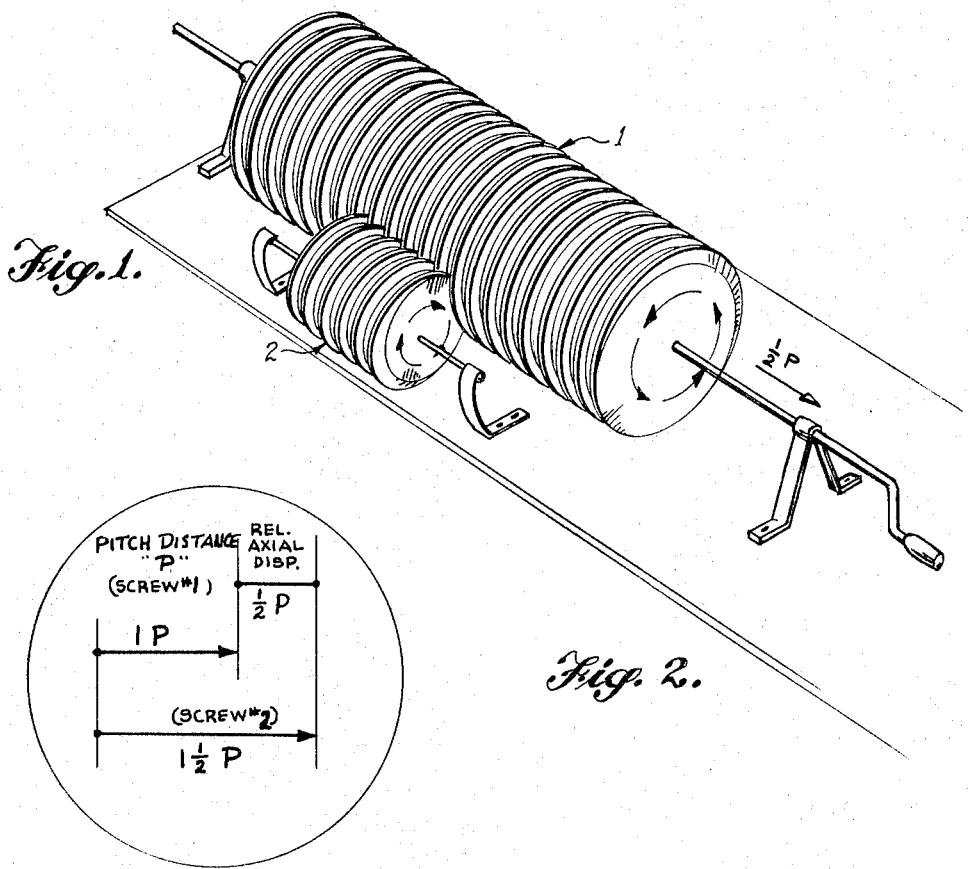
FIGURE 1 shows the basic principle of the invention. Two threaded elements having equal pitches but different pitch diameters are placed side by side with their threads engaged.
Figure 2:
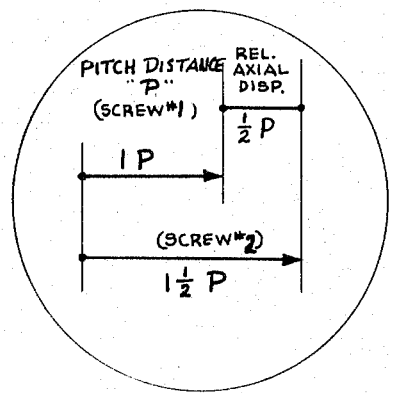
FIGURE 2 is a graphic illustration which shows the relative axial displacement between the threaded elements after the completion of one revolution by the threaded element having the largest pitch diameter.
Figure 3:
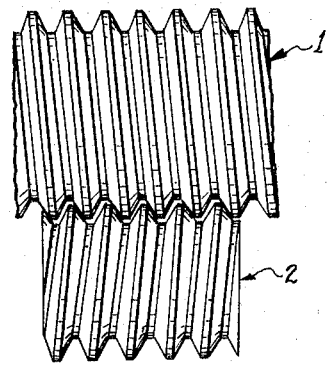
FIGURE 3 shows the type of threading which is preferred for use in this invention for best efficiency.
Figure 4:
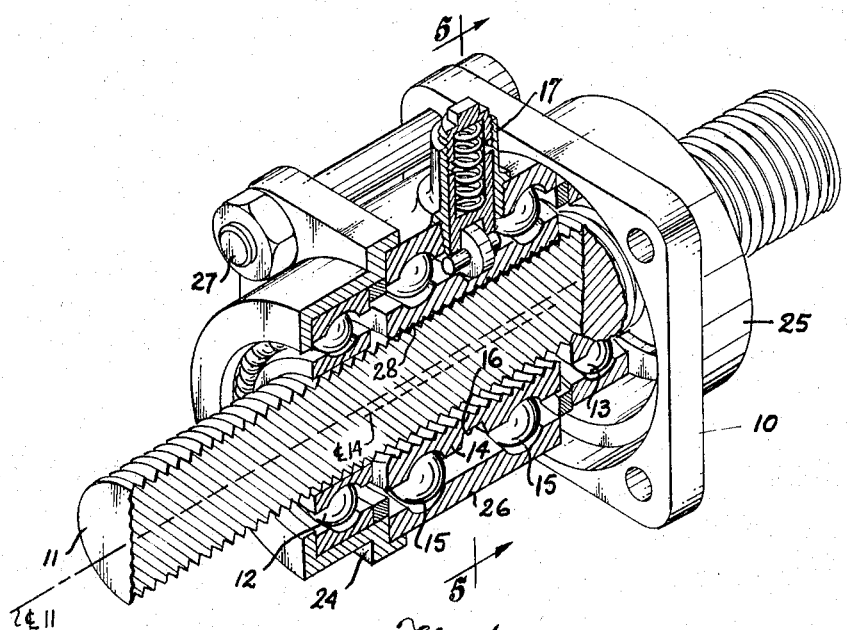
FIGURE 4 shows an isometric illustration of a preferred embodiment of the dual ratio motion converter and wherein a vertical sectional view shows the internal construction details which accomplish the automatic dual ratio feature of the converter.
Figure 5:
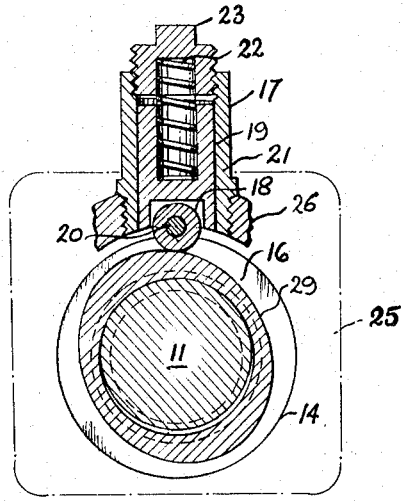
FIGURE 5 is a cross section taken from FIGURE 4 along line 5—5 which shows in particular the elliptical cam and adjustable cam follower arrangement.

In general, FIGURES 1, 2 and 3 are intended for introduction and clarification purposes only. The principle shown in these figures is that of two threaded elements rolling on each other with the threads of each engaged. The threads are of equal pitch but of different pitch diameters. As will be noticed, both threaded elements have external threads; however, FIGURES 4 and 5 show an externally threaded element surrounded by an internally threaded element. The mode of operation is identical for the two cases. The configuration shown in FIGURE 4 offers physical compactness and better load carrying ability at the line of contact of the engaged threads. In FIGURE 4 the internally threaded element or nut must be of a larger pitch diameter than the threaded shaft, whereas in FIGURES 1 and 2 the friction driven screw element has the smaller pitch diameter.

By way of introduction to explain the operation of this device, first assume that the two threaded elements shown in FIGURE 1 have equal pitch diameters with threads of equal pitch but of opposite hand. With a torque applied to threaded element 1, threaded element 2 will be driven by friction in the opposite direction and the advance of the threads of one element will exactly match that of the other so that no axial displacement between them will occur.

However, if the pitch diameters of the threaded elements of FIGURE 1 are not equal, then one turn of either element will produce more or less than one turn of the other element. Accordingly, the thread advance of the two elements will not be equal. The difference in the thread advance of the two elements will result in a relative axial motion between them.

Referring now to FIGURE 1, there is shown a screw 1 having a larger pitch diameter than screw 2, while the threads 3 of screw 1 are of equal pitch to the threads 4 of screw 2; however, threads 3 are of opposite hand with respect to threads 4.

One full rotation of screw 1 will produce more than one turn of the screw 2 and accordingly a slight axial displacement of screw 1 relative to screw 2 is accomplished. This advance or axial displacement of screw 1 relative to screw 2 for one turn of screw 1 can be defined as "the effective pitch." With threaded elements of a given pitch, the effective pitch is directly related to the difference between the pitch diameters of the screws 1 and 2. A small difference of the pitch diameters of screws 1 and 2 will result in a small effective pitch and vice versa. Referring now to FIGURE 2, and assuming that the pitch diameter of screw 1 is one and one-half times that of screw 2, it can be seen that one revolution of screw 1 will produce one and one-half revolutions of screw 2. Therefore, the threads of screw 1 will advance the pitch distance "P," and the threads of screw 2 will advance one and one-half times the pitch distance, or one and one-half "P." Since the threads are held engaged, this inequality in thread advance causes a relative axial motion between the two screws. The amount of this relative axial displacement is equal to the difference in the thread advance between the two elements, or in this case ½ "P."

If screw 2 is prevented from rotating, then each revolution of screw 1 would advance threads one pitch distance and the axial displacement between the screws is equal to "P."

The dual ratio operation is obtained by allowing screw 2 to turn in one case and restraining its rotation for the other. Thus, the different relative displacement as explained above is obtained in each case.

The operation as explained above relates as well to a device having externally and internally threaded elements as shown in FIGURE 4.

The two threaded elements are in rolling contact at their pitch diameters, one being powered and the other being driven by friction at the line of contact. Threaded elements having equal pitches but with different pitch diameters will have different helix angles for the threads, which situation is inherent in this device, and it necessitates sloping sides of the threads in order to allow clearance between them. Threading such as Acme is the most preferable in the device as shown in FIGURE 4. This type thread provides the necessary clearance as shown in FIGURE 3.

One of the preferred embodiments of the present invention is shown in FIGURE 4. A support structure or journal box assembly 10 composed of end caps 24 and 25, center section 26, and assembly bolts 27, carries a threaded shaft 11 on ball bearing means 12 and 13 which are mounted in the end caps 24 and 25 respectively. An internally threaded element or nut 14, which is supported by anti-friction bearing means 15 mounted in the center section 26, surrounds the externally threaded shaft 11. The ball raceways of section 26 are eccentric with the outer cylindrical surface of section 26, so that the axis of rotation of the nut 14 is not coaxial with, but is parallel to the longitudinal axis of shaft 11. The amount of offset between the axis of the nut 14 and the axis of the shaft 11 is sufficient to allow for full engagement of the threads of each element along line 28. At the midpoint of the outer surface of the nut 14 is a circumferential slot 16 having a surface 29 which varies in depth radially so as to form a cam. FIGURE 5 illustrates cam surface 29 as being essentially elliptical. The cam 29 is contacted by a cam follower ararngement 17 which is provided with a freely rotating roller 18 mounted on plunger 19 by means of an axle 20. The plunger 19 is slideably mounted in the casing 21 which is threaded into section 26. Plunger 19 is spring biased by spring means 22 which is held in place by adjusting screw means 23.

FIGURE 5 is a sectional view taken from FIGURE 4 along line 5—5 and shows in particular the cam follower arrangement 17 and its roller 18 contacting the cam surface 29.

The operation of the present invention as shown in FIGURE 4 is as follows: The internally threaded element or nut 14 is restrained from rotating by the force of spring means 22 which holds the roller 18 against the cam surface 29. The internally threaded nut 14 is simultaneously urged to rotate by the friction force between the threads at the line of contact 28 between the nut 14 and the threaded shaft 11.

When the axial load on shaft 11 increases thereby increasing the friction force along line 28, the torque applied to the nut 14 because of such friction force increases. This torque opposes the restraining force caused by spring means 22, and when it increases to an amount greater than such restraining force of spring 22, nut 14 will rotate and one ratio prevails as described in the explanation above.

When the restraining force caused by spring means 22 on the internally threaded nut 14 exceeds the torque applied to nut 14 by the force of friction along line 28, then the nut is restrained from rotation and the other ratio prevails.

When this device is used as a rectilinear actuator, wherein the load on the actuator is subject to variations, an automatic change is provided in the ratio of the rotary motion to linear motion. When the device is under a low load, the above ratio is at its lower value. That is, it functions merely as a threaded shaft 11 moving through a threaded nut 14, and the linear motion or axial displacement of the shaft 11 per revolution is equal to the pitch of the threads.

When the device is under a high load, the above ratio is at its higher value. That is, the linear motion of the shaft 11 per revolution is equal to the effective pitch of the threads, which is less than the actual pitch. Thus, under high loading a greater mechanical advantage is provided by this device, and under low loading there is greater movement of the shaft 11 through nut 14 per revolution of the shaft 11.

Having thus described this invention, it will be obvious that various other structural modifications may be contemplated by those skilled in the art without departing from the spirit and scope of the invention as hereinafter defined by the appended claims.

I claim:

1. A dual ratio motion converter for converting rotary motion into rectilinear motion, comprising in combination:
    (a) a first threaded member,
    (b) a second threaded member having a different pitch diameter from said first member,
    (c) said first member disposed in thread engaging relationship with said second member, and
    (d) restraining means yieldingly engaging said second member for applying a restraining force to said second member for restraining the rotation thereof so as to provide a first given ratio of linear displacement to revolutions of said first member, and permitting said second member to rotate when a predetermined increase of torque is applied to said first member so that rotation of said second member simultaneously with rotation of said first member provides a second ratio of linear displacement to revolutions of said first member.

2. The device as defined in claim 1 wherein said restraining means comprises a cam on said second member and an adjustable spring-biased cam follower engaging said cam.

3. An anti-friction dual ratio motion converter for converting rotary motion into rectilinear motion comprising in combination:
    (a) a threaded shaft disposed in a housing for rotation,
    (b) a threaded nut having threads of a pitch equal to those of said shaft and a pitch diameter larger than that of said shaft and having its threads engaged with the threads of said shaft, said nut outer surface provided with a cam shaped portion.
    (c) a first anti-friction bearing means mounted in said housing for rotational support of said shaft and having its center line coincident with said shaft center line,
    (d) a second anti-friction bearing means mounted in said housing for rotational support of said nut and having its center line coincident with the center line of said nut, and parallel to said shaft center line, and
    (e) a spring-biased cam follower mounted in said housing in contact with said cam shaped portion of said nut and adapted to restrain rotation of said nut at torque levels applied to said shaft below a predetermined amount.

4. The device as claimed in claim 3 wherein said spring-biased cam follower has adjustable spring tension means.

5. An anti-friction dual ratio motion converter for converting rotary motion into rectilinear motion comprising in combination:
    (a) a threaded shaft disposed in a housing for rotation,
    (b) a threaded nut have threads of a pitch equal to those of said shaft and a pitch diameter larger than that of said shaft and having its threads fully engaged with the threads of said shaft, said nut outer surface provided with a cam shaped portion.
    (c) a first anti-friction bearing means mounted in said housing for rotational support of said shaft and having its center line coincident with said shaft center line,
    (d) a second anti-friction bearing means mounted in said housing for rotational support of said nut and having its center line coincident with the center line of said nut, and parallel to said shaft center line, and (e) a spring-biased cam follower mounted in said housing in contact with said cam shaped portion of said nut and adapted to restrain rotation of said nut at torque levels applied to said shaft below a predetermined amount.

6. The device as claimed in claim 5 wherein said spring-biased cam follower has adjustable spring tension means.

References Cited by the Examiner
UNITED STATES PATENTS

| | | | |
|---|---|---|---|
| 2,616,302 | 11/1952 | Wahlmark | 74—459 |
| 3,128,634 | 4/1964 | Eastman | 74—424.8 |
| 3,165,007 | 1/1965 | Neubarth | 74—424.8 |

FRED C. MATTERN, JR., *Primary Examiner.*

DAVID J. WILLIAMOWSKY, *Examiner.*

L. H. GERIN, *Assistant Examiner.*